United States Patent

Hill

[11] 4,296,332
[45] Oct. 20, 1981

[54] SPROCKET HOLE SENSING DETECTOR FOR MOVING TRANSLUCENT PAPER SHEETS

[75] Inventor: Roy K. Hill, Bristol, Va.

[73] Assignee: Sperry Corporation, New York, N.Y.

[21] Appl. No.: 108,099

[22] Filed: Dec. 28, 1979

[51] Int. Cl.³ .............................................. G06K 7/14
[52] U.S. Cl. ..................................... 250/570; 235/458
[58] Field of Search ............... 250/570, 555, 557, 566, 250/568, 569, 231 SE; 235/458, 461, 459, 460

[56] References Cited

U.S. PATENT DOCUMENTS

| | | | |
|---|---|---|---|
| 2,448,830 | 9/1948 | Robbins et al. ................. | 250/555 X |
| 3,244,895 | 4/1966 | Anderegg, Jr. ................. | 250/231 SE |
| 3,742,486 | 6/1973 | Skidmore ........................ | 250/227 X |
| 4,143,268 | 3/1979 | Marold et al. ................. | 250/231 SE |

*Primary Examiner*—David C. Nelms
*Assistant Examiner*—Edward P. Westin
*Attorney, Agent, or Firm*—John B. Sowell; William E. Cleaver; Marshall M. Truex

[57] ABSTRACT

A light emitting source and a light sensing device are permanently fixed on one side of a moving object substantially separated one from the other. The light rays from the source are bent or reflected in a predetermined path so that the light rays to be sensed passes through at least two holes in said moving object before being sensed, thus enhancing the light to dark ratio and reducing the probability of false readings.

4 Claims, 4 Drawing Figures

SPROCKET HOLE SENSING DETECTOR FOR MOVING TRANSLUCENT PAPER SHEETS

BACKGROUND OF THE INVENTION

1. Field of the Invention

The present invention is related to light sensing systems. More particularly, the present invention is related to a novel light and dark sensing system for thin paper having sprocket holes on the edges such as is presently used in high speed printers employed at the output of computers.

2. Description of the Prior Art

Apparatus for sensing the presence or absence of an aperture in a moving object are generally well known. IBM cards and Hollerith cards for looms have been read by various means including light sensing means before the advent of the electronic computer.

Prior art light sensing systems have employed light emitting diodes as a light source and photo transistors as light sensing devices. For purposes of this discussion, the prior art systems generally fall into two types. Either the light source is directed completely through the aperture in the object and sensed on the opposite side or the light source is directed to markings on the object and the amount of relfected light is employed to determine the presence or absence of marking on the object. In the latter type of system it is known that a high light to dark ratio is required to accurately detect marking.

High speed printers for computers have encountered similar problems. Rapid movement of the sprocketed paper generates a fine paper dust or powder which is highly reflective. This dust may collect in the apertures of the paper or in recesses of the paper guides, causing the light detecting devices to sense the absence of an aperture where, in fact, an aperture exists.

The paper presently employed in high speed printers for computers is translucent and very thin. It is possible to read printed copy through one sheet of such paper when sheets are placed one upon the other. Further, the translucent paper transmits a high percentage of light even though it is somewhat diffused.

There is no way for a light sensing device to determine whether the light rays it receives are diffused light passing through thin translucent paper or whether the diffused light is the result of reflections and/or blockages caused by the fine paper powder or dust generated in high speed printers.

It has been suggested that the light sources and the light sensing devices be sealed or encapsulated from vapor or dust. While this arrangement provides improved results it does not eliminate the paper dust or powder or the light diffusion caused by its presence in the system.

It would be extremely desirable to provide a hole sensing detector system which is cheap and reliable and operates in spite of adverse conditions presented by the presence of paper powder and dust.

SUMMARY OF THE INVENTION

It is a principal object of the present invention to provide a novel and improved hole sensing detector system which has a very high light to dark ratio.

It is another object of the present invention to provide a novel and improved hole sensing detector system which detects the presence or absence of two or more thicknesses of thin translucent paper.

It is yet another object of the present invention to provide a novel and improved hole sensing detector system which is extremely efficient, reliable and yet very cheap to manufacture.

According to these and other objects of the present invention, to be discussed in greater detail herinafter, there is provided a module containing a light source and a light detecting device separated from each other by a predetermined distance equal to one or more sprocketed hole distances. A second module is provided which receives the light rays from the light source through one sprocket hole and directs the light to the light detecting device through a different sprocket hole, thus, enhancing the light to dark ratio.

BRIEF DESCRIPTION OF THE DRAWINGS

The foregoing options and advantages of the novel hole sensing detector and its mode of operation will be made apparent from the detailed description of the accompanying drawings in which.

DESCRIPTION OF THE PREFERRED EMBODIMENT

Figure 1:
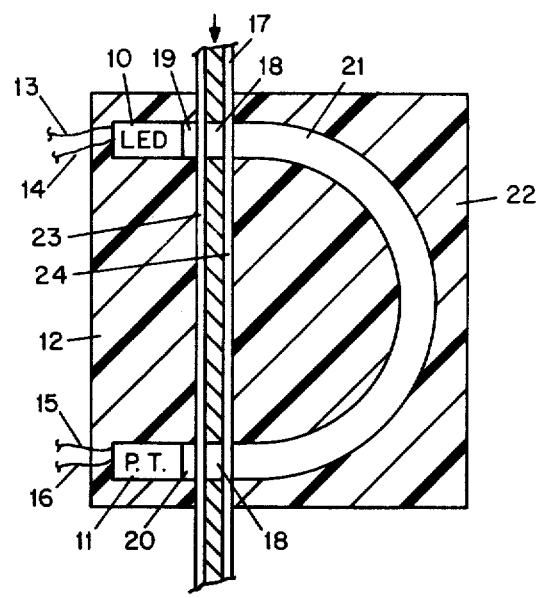
FIG. 1 is an enlarged elevation in section showing a preferred embodiment of the novel hole sensing device.

FIG. 1 shows a preferred embodiment transducer which comprises a light emitting diode 10 and a photo transistor 11 which are encapsulated in a plastic body 12. The light source 10 has electrical leads 13 and 14 connected to the light emitting diode and the photo transistor has leads 15 and 16 connected thereto. The manner in which light emitting diodes are actuated and the manner in which photo transistors receive and detect light are well known and do not require explanation for purposes of this invention.

It is intended that the transducer body 12 be mounted on one side of a sheet of moving paper 17 which has regularly occuring sprocket holes 18 therein. To prevent dust or paper chaff from attenuating the light signals there is provided hard glass or sapphire windows 19 and 20 in front of the light emitting diode 10 and the photo detector transistor 11.

Light emanating from light emitting diode 10 is either blocked by the moving paper 17 or transmitted through the aligned holes or apertures 18 as is shown in FIG. 1. When the light is transmitted through apertures 18 it is received by light ray directing mean 21 which is shown in a horseshoe or 'U' shape configuration. The light ray directing means 21 may be a fiber optic bundle or a plastic light ray tube or other forms of light directing plastics. Light ray directing means 21 is preferably encapsulated in a plastic mounting base 22 and provided with means for mounting it closely adjacent to moving paper 17 on the side opposite the transducer mounting block 12. When the light from ray emitting diode 10 passes through the light ray directing means the distance is preferably very short and the attenuation of the light caused by the light ray directing means is very small. It will be understood that when dust or paper chaff collects in one aperture 18 it is entirely unlikely to collect in the adjacent hold so as to cause double attenuation which would be sensed as no hole. It will be noted that the faces of mounting blocks 22 and 12 are completely smooth and provide no recesses for collection of dust and chaff and, therefore, perform as self-cleaning elements. This is to say that any paper or dust or punched holes attempting to accumulate will be swept clean by the moving paper. When detectors of the type shown in FIG. 1 are employed with high speed printers it is not necessary to detect every hole as a clean hole in order to perform the logic functions associated with such detectors. When the paper 17 is blocking the light path from light emitting diode 10 there is some transmission through the single thickness of paper and the light is transmitted through light ray directing means 21 and attempts to reach photo transistor 11 but is blocked by a second thickness of paper. Accordingly, the light to dark ratio of the sensing device is substantially enhanced when detecting translucent papers.

Figure 2:
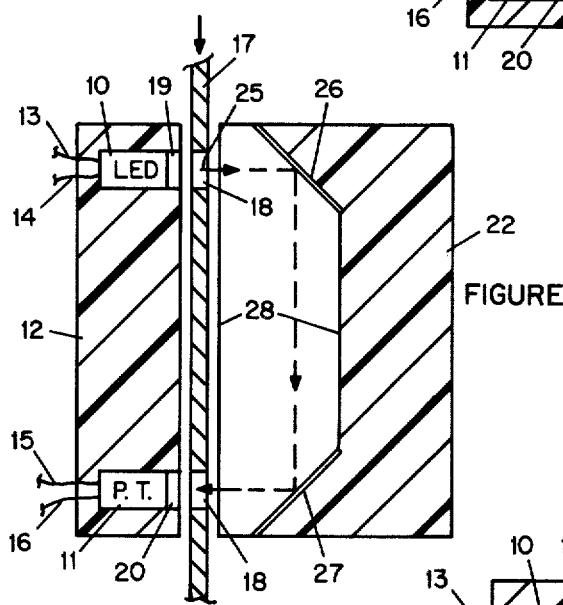
FIG. 2 is an enlarged elevation in section showing a modified form of the hole sensing device shown in FIG. 1.

Refer to FIG. 2 showing a modified embodiment of the sensing apparatus of FIG. 1. The transducer and detecting means are identical to those shown in FIG. 1. The transducer comprises a light emitting diode 10 and a photo transducer 11 separated from each other by a distance equal to one or more sprocket holes in the moving paper 17. When light is emitted from light emitting diode 10 the light rays 25, shown in phantom lines, are reflected from a front surface mirror 26 and projected on to a second front surface mirror 27 and directed directly into photo transistor 11. It will be understood that individual front surface mirrors 26 and 27 could replace the prism generally shown as element 28. The prism device is preferred in the embodiment shown because the individual mirrors would not transmit light as well through the encapsulating plastic of body 22 as it would through a prism device 28. As explained with reference to FIG. 1, light emitting diode 10 and photo transistor 11 are provided with hard glass windows 19 and 20 and the two bodies 12 and 22 are provided with flat surfaces adjacent the moving paper 17 to provide a self-cleaning feature.

Figure 3:
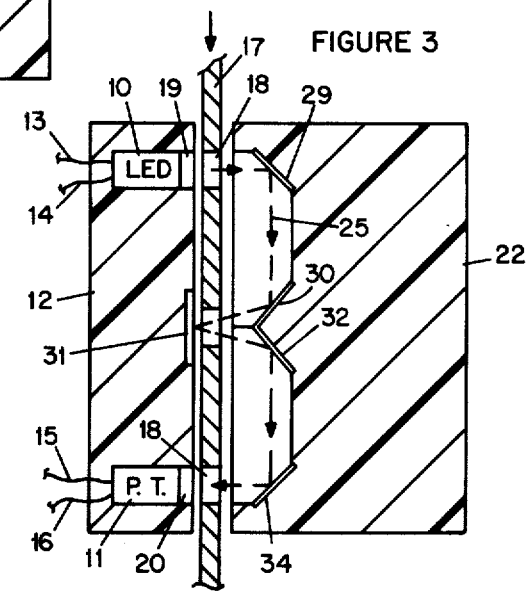
FIG. 3 is an enlarged section in elevation of a modified embodiment of the hole sensing device shown in FIG. 2.

Referring now to FIG. 3, the transducer on the left side of the paper is identical to the transducer explained hereinbefore with reference to FIGS. 1 and 2 wherein there is provided a light emitting diode 10 and a photo transistor receiver 11. Light emitted from light emitting diode 10 is directed along light ray path 25 and reflected from a first prism surface 29 to a second prism surface 30 and onto a front surface mirror 31 from which it is reflected to a third prism surface 32 and from there to a fourth mirror surface 35 and then to the photo transistor receiver 11. It will be appreciated that three holes are sensed by the light rays 25 before it is received at photo transistor 11. The possibility of having three successive malfunctions in the sprocket holes of paper 17 is very unlikely. It is not necessary to provide the sensing of the holes to achieve a desired light to dark ratio for sensing holes or the absence of holes. It has been found sufficient to sense two thicknesses of thin translucent paper to make a logical detection choice between the presence or absence of a hole.

At the present state of the art, it is not necessary to sense more than two thicknesses of paper; however, it will be understood that the light emitting diode 10 and the photo transistor receive 11 shown in the figures may be separated from each other by any number of sprocket holes and reversal 'U' tubes or reversal prisms provided on either side of the paper to sense additional holes should the need arise in the future.

Figure 4:
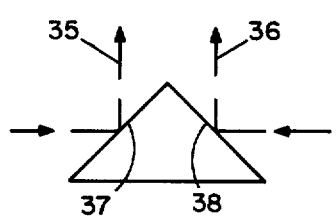
FIG. 4 is a plan view of a miniature prism of the type which may be employed in the modified embodiments of FIGS. 2 and 3.

FIG. 4 illustrates a simple two-sided frontal reflecting surface prism which may be mounted on a flat sheet mounting body like body 22 without a need for encapsulating the light ray directing means. Light rays 35 and 36 directed to the surfaces 37 and 38 may be reflected at any desired angle as is well know in the optic art.

Having explained a preferred embodiment of the apparatus for sensing apertures it will be understood that the device is simple to manufacture from commercially available components and provides reliability and durability with the advantage of enhanced sensing of light to dark ratio. Due to the increased capability of sensing light to dark ratio, it has not been found necessary to provide sensitivity adjusting means associated with the photo transistor as is employed in prior art sensing devices.

I claim:

1. An apparatus for sensing sprocket apertures in a translucent moving paper sheet in a reflective dust environment, the combination comprising, a fixed source of light adapted to be directed in the path of a plurality of regularly spaced open sprocket apertures in said translucent moving paper sheet, said light source having an intensity sufficient to continuously pass light through said translucent moving paper sheet and dust clogged apertures as well as the open sprocket apertures, a light sensing device separated from and fixed relative to said light source and adapted to continuously sense rays from said light source, encapsulating mounting means supporting said light source and said light sensing device at a predetermined number of regularly spaced sprocket apertures from each other, and light ray directing means located on the opposite side of said translucent moving paper sheet from said light source and said sensing device, said light ray directing means adapted for continuous receiving diffused light rays from said light source through said translucent moving paper sheet or dust clogged aperture in said moving sheet and for directing said diffused light rays through a different aperture in said same moving sheet to said light sensing device, whereby said light sensing device is adapted to continuously sense the level of light intensity being received and to distinguish between the presence or the absence of at least two thicknesses of said translucent moving paper sheet by sensing the light to dark ratio.

2. An apparatus as set forth in claim 1 wherein said light ray directing means comprise a plurality of flat highly reflective surfaces adapted to bend said light rays 180° or more.

3. An apparatus as set forth in claim 2 wherein said light ray directing means directs said received light rays through at least two different apertures.

4. An apparatus as set forth in claim 1 wherein said light ray directing means comprises a plurality of fiber optic cables arranged in a random bundle and bent to direct said light rays through an angle of 180°.

* * * * *